United States Patent Office 3,276,741
Patented Oct. 4, 1966

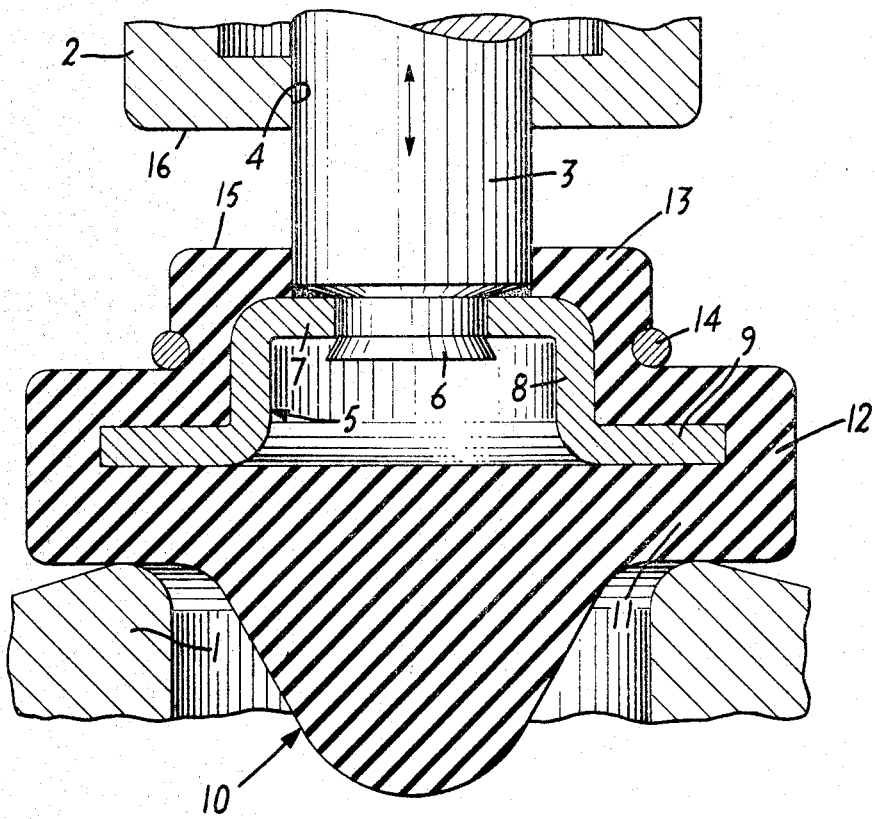

3,276,741
VALVE AND VALVE DISC
Helmar Trøst Nielsen, Nordborg, and Knud Aage Hansen, Sonderborg, Denmark, assignors to Danfoss ved ing. M. Clausen, Nordborg, Denmark, a company of Denmark
Filed Jan. 28, 1964, Ser. No. 340,719
Claims priority, application Germany, Feb. 20, 1963, D 40,942
3 Claims. (Cl. 251—330)

This invention relates generally to valves and more particularly to a new and improved valve disc.

The use of an elastic or resilient material, for example rubber, for the construction of valve discs is known. This kind of disc material lends itself to streamlining in order to reduce the effect of the disc on fluid flow through a valve body. However, in view of the compliance of the material used, the valve discs made must generally be supported by a supporting plate or member which distributes the valve stem pressure equally throughout the sealing surface of the disc.

In most valve constructions, it is customary to position the valve stem extending inwardly into a valve body and outwardly thereof. Although the valve stem is generally snugly fitted into a valve guide portion of a valve body, means are usually provided for preventing fluid leakage along the valve stem, for example by the use of packed valve stems and the like.

In packed valve stem valves, the valve is subject to leakage when the valve packing assembly is removed. In order to preclude this kind of leakage a valve disc is sometimes provided which is constructed with an auxiliary sealing area which is disposed circumferentially of the valve stem and engages the valve stem guide portion of the valve in an effective seal to preclude leakage outwardly of the valve body along the valve stem. Generally, the second or auxiliary seal function is established by actuating the valve disc to an unseated position in which the valve is in an open condition and the disc is moved into a position carrying out its secondary function of sealing the valve stem. The known discs of this type require relatively complex means for mounting or attaching them to the valve stem that actuates them.

It is a principal object of the present invention to provide a new and improved valve body and simplified, removable and replaceable valve disc in which an auxiliary or second sealing area is provided for effectively sealing the valve steam to preclude leakage along it and outwardly of a valve body.

Another object is to provide a simple valve disc construction in which the disc carries out the sealing function sometimes carried out by additional sealing discs employed in various valve constructions.

A feature of the invention is the provision of a valve disc made of a stretchable material which has restoration characteristics so that an opening into a cavity of the disc can be stretched open and the valve disc fitted or inserted over a carrying and pressure applying support plate secured to a valve stem without the use of a complex retaining means.

Other features and advantages of the valve disc in accordance with the present invention will be better understood as described in the following specification and appended claims, in conjunction with the drawing which is an enlarged fragmentary sectional view of a valve body provided with a valve disc according to the invention.

Although the present invention will be described as applied to a packed stem valve it is to be understood that the present invention is equally applicable to all types of valves in which the valve disc carries out a sealing function to preclude leakage along the valve stem when the valve is in an open condition.

According to the drawing, a valve body, fragmentarily shown, comprises means defining an annular seat 1 disposed circumferentially of a fluid passageway or opening which is opened and closed by a valve disc according to the invention as later described. The valve body comprises a valve stem guide portion 2 through which a valve stem 3 extends snugly through an opening 4 therein inwardly into the valve body. The valve stem 3 is actuatable in opposite directions axially as illustrated by the arrow. The valve stem 3 may be actuated axially, for example manually or by means of a thermostatic regulator, not shown, mountable and connectable to the valve stem 3 and having actuator means which are thermostatically actuated for opening and closing the valve.

The valve body is provided with a rigid cup-shaped disc support plate or member 5 having a central plate portion 7 secured to the valve stem 3 by means of a rivet portion 6 on the end of the valve stem 3. The support member 5 comprises an annular portion 8 integral with the plate portion 7 and to which is connected a rigid annular flange portion 9 extending radially outwardly therefrom at the mouth or open end of the cup-shaped member and extending radially from the center axis of the valve stem 3 sufficiently to overlap the annular seat 1 of the valve body.

The valve body according to the invention comprises a valve disc 10 made of an elastic material, for example of formed or molded rubber, having an annular portion 11 having an underside surface engageable and defining a sealing surface seatable on the seat 1 in the position illustrated in the drawing in which the valve is closed. The valve disc is provided with an integral portion 12 extending radially outwardly of the support plate or member 5. An upper integral cylindrical cup part 13 of the valve disc 10 is provided with an opening as illustrated and defines a cavity in conjunction with the portions 11 and 12 such that when the cavity opening is opened by stretching the valve disc, for opening and placing the disc over the valve support member 5, the member 5 is releasably insertable into the cavity of the valve disc and conforms therewith. The valve disc is thus removable and replaceable by slipping on a replacement.

The cup portion 13 conforms to the annular cup part 8 and the plate 7 of the support member and fits sufficiently snugly thereon so that the valve disc remains in position. However, preferably at a point of juncture between the portion 13 and the annular portion 12, a recess is provided in the valve disc 10 for receiving a keeper ring 14 for holding the valve disc positively snugly in position with respect to the support plate or member 5. The ring 14 extends circumferentially of the cup portion 13 and cup parts 7, 8 of the support member.

When the valve stem 3 is actuated to the position illustrated in the drawing, the rigid annular flange 9, which is coaxial with the seat 1, in conjunction with the compressible part 11 of the valve member carries out an effective closing of the valve. When the valve stem 3 is actuated in an opposite direction and sufficiently spaced away from the seat 1, an annular sealing surface 15 provided on the portion 13 circumferentially of the valve stem will engage with an underside annular surface 16 of the valve stem guide means 2 of the valve body and carry out an effective seal therebetween to preclude leakage along the valve stem 3 outwardly of the valve body.

Thus by actuating the valve stem 3 in a direction opposite from the direction toward the valve seat 1 for a sufficient distance the secondary function of the valve stem disc is rendered effective and the valve is opened and leakage is completely precluded along the valve stem disc 3 so that in the example illustrated in the event that the valve body in which the invention is being used is for example a packed stem valve of the type disclosed in our copending application, Serial No. 331,230 filed December 17, 1963, the valve stem packing, not shown, can be removed and repacked with the valve remaining operative wherever it is being used.

While a preferred embodiment of the invention has been shown and described, it will be understood that many modifications and changes can be made within the true spirit and scope of the invention.

What we claim and desire to secure by Letters Patent is:

1. In a valve body having means defining a valve seat, a valve stem extending axially into said valve body, a valve body portion for axially guiding said valve stem having a sealing surface disposed circumferentially of said valve stem interiorly of said valve body, a resilient valve disc mounted in operation on said valve stem and having a first portion comprising a first surface seatable on said seat for closing said valve and a second portion comprising a second surface seatable on said sealing surface for preventing leakage along said valve stem when said valve disc is unseated to allow fluid flow through said valve body, said valve stem being mounted in said valve body portion for selective movement axially variably in a direction toward said seat for seating said valve disc on said seat to preclude fluid flow through said valve body and in an opposite direction to unseat said disc to allow fluid flow and movable axially in said opposite direction to seat said second surface on said sealing surface to preclude said leakage along said valve stem, a member secured to said valve stem for holding said valve disc disposed in operation internally of said disc and having a radial flange extending radially sufficiently to apply a pressure to said first surface seatable on said seat in dependence upon the axial position of said valve stem, said member comprising a cup-shaped portion, said flange being disposed extending radially outwardly of said cup-shaped portion circumferentially of an open end of said cup-shaped portion, said disc comprising a cavity for receiving said member and having said second portion disposed over said cup-shaped portion including said second surface circumferentially of said valve stem positionable in engagement with said sealing surface to effectively define a seal between said disc and said valve body portion to preclude fluid leakage outwardly of said valve body along said valve stem.

2. In a valve body according to claim 1, including a keeper ring mounted circumferentially of said second portion of said disc to apply said second portion against said cup-shaped portion of said member.

3. In a valve body according to claim 2, in which said second portion of said disc comprises an outer recess circumferentially thereof for receiving said keeper ring.

References Cited by the Examiner

UNITED STATES PATENTS

| 1,947,257 | 2/1934 | Fritz et al. | 251—357 X |
| 2,842,333 | 7/1958 | Kent | 251—357 X |
| 2,920,861 | 1/1960 | Hartman | 251—357 |
| 2,924,232 | 2/1960 | Michaels | 251—330 X |

FOREIGN PATENTS

| 1,193,567 | 4/1959 | France. |

M. CARY NELSON, *Primary Examiner.*

A. ROSENTHAL, *Assistant Examiner.*